US012570860B2

(12) United States Patent
Senzaki

(10) Patent No.: US 12,570,860 B2
(45) Date of Patent: Mar. 10, 2026

(54) TWO-COMPONENT TREATMENT AGENT, TREATMENT METHOD FOR MAKING METAL SURFACE ANTIBACTERIAL AND ANTIBACTERIAL TREATMENT AGENT

(71) Applicant: TOKYO OHKA KOGYO CO., LTD., Kanagawa (JP)

(72) Inventor: Takahiro Senzaki, Kanagawa (JP)

(73) Assignee: TOKYO OHKA KOGYO CO., LTD., Kanagawa (JP)

( * ) Notice: Subject to any disclaimer, the term of this patent is extended or adjusted under 35 U.S.C. 154(b) by 981 days.

(21) Appl. No.: 17/677,309

(22) Filed: Feb. 22, 2022

(65) Prior Publication Data

US 2022/0267615 A1 Aug. 25, 2022

(30) Foreign Application Priority Data

Feb. 22, 2021 (JP) ................................ 2021-026595

(51) Int. Cl.

| | |
|---|---|
| ***C09D 5/14*** | (2006.01) |
| ***A01N 33/12*** | (2006.01) |
| ***A01N 43/40*** | (2006.01) |
| ***B05D 7/14*** | (2006.01) |
| ***C08F 271/00*** | (2006.01) |
| ***C08K 5/5425*** | (2006.01) |
| ***C09D 4/06*** | (2006.01) |
| ***C09D 5/00*** | (2006.01) |
| ***C09D 7/63*** | (2018.01) |
| ***C09D 139/02*** | (2006.01) |
| ***C09D 179/02*** | (2006.01) |
| ***C09D 201/02*** | (2006.01) |

(52) U.S. Cl.

CPC ............... *C09D 5/14* (2013.01); *A01N 33/12* (2013.01); *A01N 43/40* (2013.01); *B05D 7/14* (2013.01); *C08F 271/00* (2013.01); *C09D 4/06* (2013.01); *C09D 5/002* (2013.01); *C09D 7/63* (2018.01); *C09D 139/02* (2013.01); *C09D 179/02* (2013.01); *C09D 201/02* (2013.01); *C08K 5/5425* (2013.01)

(58) Field of Classification Search

CPC ........ C09D 5/14; C09D 5/002; C09D 179/02; C09D 7/63; C09D 4/06; C09D 139/02; C09D 201/02; C08F 271/00; C08K 5/5425; C08K 5/19; A01N 33/12; A01N 43/40; B05D 7/14

See application file for complete search history.

(56) References Cited

U.S. PATENT DOCUMENTS

2002/0168473 A1* 11/2002 Ottersbach ............ C04B 41/483 427/337
2005/0095266 A1 5/2005 Perichaud et al.
2006/0008490 A1 1/2006 Russell et al.
2006/0286059 A1* 12/2006 Yang ..................... A61K 33/00 424/70.16
2015/0368380 A1* 12/2015 Kreyenschmidt ....... C08F 26/06 526/263

FOREIGN PATENT DOCUMENTS

| | | |
|---|---|---|
| CN | 203305592 U * | 11/2013 |
| CN | 111944369 | 11/2020 |
| JP | 01-297482 | 11/1989 |
| JP | 2000-109983 | 4/2000 |
| JP | 2006-507111 | 3/2006 |
| JP | 2007-267757 | 10/2007 |
| JP | 2014-9306 | 1/2014 |
| JP | 2014-201859 | 10/2014 |
| JP | 2014-210859 | 11/2014 |
| JP | 2016-206275 | 12/2016 |
| JP | 2019-81161 | 5/2019 |
| JP | 2020-70254 | 5/2020 |

OTHER PUBLICATIONS

Machine English translation of CN 203305592, Ma, Nov. 27, 2013.*

* cited by examiner

*Primary Examiner* — Patrick D Niland

(74) *Attorney, Agent, or Firm* — Wenderoth, Lind & Ponack, L.L.P.

(57) ABSTRACT

To provide a two-component treatment agent that is capable of easily making a metal surface composed of a variety of metals antibacterial by application thereof and can be used in an antibacterial treatment of a metal surface, a treatment method for making a metal surface antibacterial using the two-component treatment agent, and an antibacterial treatment agent that can be incorporated in the two-component treatment agent. An antibacterial treatment is carried out on a metal surface using a two-component treatment agent composed of a primer solution containing a metallic bonding compound (A) having a functional group capable of bonding to the metal surface and an antibacterial solution containing an antibacterial layer-forming compound (B), wherein the metallic bonding compound (A) and the antibacterial layer-forming compound (B) are capable of forming a covalent bond.

10 Claims, No Drawings

TWO-COMPONENT TREATMENT AGENT, TREATMENT METHOD FOR MAKING METAL SURFACE ANTIBACTERIAL AND ANTIBACTERIAL TREATMENT AGENT

BACKGROUND OF THE INVENTION

Field of the Invention

The present invention relates to a two-component treatment agent, a treatment method for making a metal surface antibacterial using the two-component treatment agent, and an antibacterial treatment agent that can be preferably incorporated in the two-component treatment agent.

Related Art

Due to the explosive pandemic of the novel coronavirus infection, which began in 2020, consumers are rapidly becoming more hygienically conscious. Such a circumstance is raising the need not only for antivirally treated products but also for antibacterially treated products. Particularly for metal products that are often touched by human hands during use such as door knobs, handrails, window frames, water faucets and sinks, there is huge need for antibacterial treatments.

As a method for making metal products antibacterial, for example, a method in which an ε-Cu phase having a specific average grain diameter is provided in stainless steel (refer to Patent Document 1) has been proposed.

Patent Document 1: Japanese Unexamined Patent Application, Publication No. 2016-206275

SUMMARY OF THE INVENTION

However, regarding the method described in Patent Document 1, a problem is that the method is applicable only to an extremely narrow range of metal types. This creates a demand for a method enabling a variety of metals to be easily made antibacterial.

The present invention has been made in consideration of the above-described problem, and an objective of the present invention is to provide a two-component treatment agent that is capable of easily making a metal surface composed of a variety of metals antibacterial by application thereof and can be used in an antibacterial treatment of a metal surface, a treatment method for making a metal surface antibacterial using the two-component treatment agent, and an antibacterial treatment agent that can be incorporated in the two-component treatment agent.

The present inventors have found that the above-described problem can be solved by carrying out an antibacterial treatment on a metal surface using a two-component treatment agent composed of a primer solution containing a metallic bonding compound (A) having a functional group capable of bonding to the metal surface and an antibacterial solution containing an antibacterial layer-forming compound (B), wherein the metallic bonding compound (A) and the antibacterial layer-forming compound (B) are capable of forming a covalent bond, and have completed the present invention. In more detail, the present invention provides the followings.

A first aspect of the present invention is a two-component treatment agent used for an antibacterial treatment of a metal surface, the two-component treatment agent composed of a primer solution containing a metallic bonding compound (A) having a functional group capable of bonding to the metal surface and an antibacterial solution containing an antibacterial layer-forming compound (B), wherein the metallic bonding compound (A) and the antibacterial layer-forming compound (B) are capable of forming a covalent bond.

A second aspect of the present invention is a treatment method for making a metal surface antibacterial using the two-component treatment agent according to the first aspect, the method including:

a primer treatment of applying the primer solution to the metal surface and then bonding the metallic bonding compound (A) in the primer solution to the metal surface; and an antibacterial treatment of applying the antibacterial solution to the metal surface subjected to the primer treatment.

A third aspect of the present invention is an antibacterial treatment agent including at least one selected from the group consisting of a compound represented by the following formula (b1):

$$CH{=}CR^{b1}{-}CO{-}R^{b6}{-}R_{b2}{-}N^{+}R^{b3}R^{b4}R^{b5}\cdot X^{-} \qquad (b1),$$

2-vinylpyridine, 3-vinylpyridine and 4-vinylpyridine, wherein, in the formula (b1), $R^{b1}$ is a hydrogen atom or a methyl group, $R^{b2}$ is an alkylene group having 1 or more and 8 or less carbon atoms, $R^{b3}$, $R^{b4}$ and $R^{b5}$ are each independently an alkyl group having 1 or more and 4 or less carbon atoms or an aralkyl group having 7 or more and 10 or less carbon atoms, $R^{b6}$ is —O— or —NH—, and $X^-$ is a counter anion for a quaternary ammonium cation.

According to the present invention, it is possible to provide a two-component treatment agent that is capable of easily making a metal surface composed of a variety of metals antibacterial by application thereof and can be used in an antibacterial treatment of a metal surface, a treatment method for making a metal surface antibacterial using the two-component treatment agent, and an antibacterial treatment agent that can be incorporated in the two-component treatment agent.

DETAILED DESCRIPTION OF THE INVENTION

<<Two-Component Treatment Agent>>

A two-component treatment agent is composed of a primer solution and an antibacterial solution. The primer solution contains a metallic bonding compound (A) having a functional group capable of bonding to a metal surface. The antibacterial solution contains an antibacterial layer-forming compound (B). The metallic bonding compound (A) and the antibacterial layer-forming compound (B) are capable of forming a covalent bond.

When a primer treatment of applying the primer solution to a metal surface and an antibacterial treatment of applying the antibacterial solution to the metal surface subjected to the primer treatment are carried out, it is possible to bond the metallic bonding compound (A) to the metal surface and bond the antibacterial layer-forming compound (B) to the metallic bonding compound (A), which has bonded to the metal surface. Therefore, when the metal surface is treated with the two-component treatment agent, an antibacterial layer strongly bonding to the metal surface through a primer layer is formed, and the metal surface is favorably made antibacterial.

Hereinafter, the primer solution and the antibacterial solution will be described in order.

<Primer Solution>

The primer solution contains a metallic bonding compound (A) having a functional group capable of bonding to a metal surface. Hereinafter, essential or arbitrary components that the primer solution contains will be described.

[Metallic Bonding Compound (A)]

The metallic bonding compound (A) has a functional group capable of bonding to a metal surface. Examples of a bond between the metallic bonding compound (A) and the metal surface include a covalent bond and a coordinate bond.

Preferable examples of the functional group capable of bonding to a metal surface include a phosphate group ($—O—P(=O)(OH)_2$), a hydrolysable silyl group and a mercapto group. Among these groups, the phosphate group and the mercapto group are coordinated to the metal surface and thereby bond to the metal surface. The hydrolysable silyl group is a silyl group capable of generating a silanol group by hydrolysis. The silanol group generated by hydrolysis and a hydroxyl group present on the metal surface condense and thereby form a covalent bond.

Preferable examples of the hydrolysable silyl group include groups represented by $—SiR^{01}{}_{a}R^{02}{}_{3-a}$. Here, $R^{01}$ is an alkoxy group and a group capable of generating a silanol group by the hydrolysis of a halogen atom or the like. As the alkoxy group, alkoxy groups having 1 or more and 4 or less carbon atoms such as a methoxy group, an ethoxy group, a n-propyloxy group, an isopropyloxy group and a n-butyloxy group are preferable. As the halogen atom, a chlorine atom and a bromine atom are preferable, and a chlorine atom is more preferable. $R^{02}$ may be a variety of organic groups that do not correspond to the group capable of generating a silanol group by hydrolysis as long as the objective of the present invention is not impaired. As such an organic group, a hydrocarbon group having 1 or more and 10 or less carbon atoms is preferable. The hydrocarbon group may be an aliphatic group, an aromatic group or a combination of an aliphatic portion and an aromatic portion. The structure of the hydrocarbon group may be linear, branched, cyclic or a combination thereof. Specific examples of the hydrocarbon group having 1 or more and 10 or less carbon atoms include a methyl group, an ethyl group, a n-propyl group, an isopropyl group, a n-butyl group, an isobutyl group, a sec-butyl group, a tert-butyl group, a n-pentyl group, a n-hexyl group, a n-heptyl group, a n-octyl group, a n-nonyl group, a n-decyl group, a phenyl group, a naphthalene-1-yl group, a naphthalene-2-yl group, a benzyl group, a phenethyl group and the like. Among these, the methyl group and the ethyl group are preferable. The above-described hydrocarbon groups may have a substituent such as an alkoxy group having 1 or more and 6 or less carbon atoms, a halogen atom, a hydroxyl group and a cyano group. a is preferably two or three and more preferably three. In addition, in a case where a is two or three, a condensation reaction is likely to occur even between the groups represented by $—SiR^{01}{}_{a}R^{02}{}_{3-a}$ present adjacent to each other on the metal surface. As a result, a network of siloxane bonds that spreads along the metal surface is formed in a coating that is formed using the primer solution, which makes it easy to particularly strongly bond the primer layer derived from the metallic bonding compound (A) to the metal surface.

Preferable specific examples of the hydrolysable silyl group represented by $—SiR^{01}{}_{a}R^{02}{}_{3-a}$ include a trimethoxysilyl group, a triethoxysilyl group, a methyldimethoxysilyl group, an ethyldimethoxysilyl group, a methyldiethoxysilyl group and an ethyldiethoxysilyl group.

The metallic bonding compound (A) is capable of forming a covalent bond by reacting with the antibacterial layer-forming compound (B) that is contained in the antibacterial solution. The reaction that forms a covalent bond between the metallic bonding compound (A) and the antibacterial layer-forming compound (B) is not particularly limited. Examples of the reaction that forms a covalent bond include

- a reaction between a hydroxyl group and a dicarboxylic anhydride group,
- a reaction between a hydroxyl group and a halogen carbonyl group,
- a reaction between a hydroxyl group and an isocyanate group,
- a reaction between a primary amine group and a dicarboxylic anhydride group,
- a reaction between a primary amine group and a halogen carbonyl group,
- a reaction between a primary amine group and an isocyanate group,
- a reaction between a primary amine group or a secondary amine group and a halogenated alkyl group,
- a reaction between a primary amine group or a secondary amine group and an ethylenic unsaturated double bond,
- a reaction between ethylenic unsaturated double bonds,
- a reaction between an epoxy group and a dicarboxylic anhydride group,
- a reaction between an epoxy group and a carboxy group,
- a reaction between an epoxy group and an amino group, and the like.

Among these combinations, the reaction between a primary amine group or a secondary amine group and an ethylenic unsaturated double bond is preferable since the reactivity during the antibacterial treatment, the stability of the primer solution and the antibacterial solution and the like are preferable. In addition, it is more preferable that the metallic bonding compound (A) has an ethylenic unsaturated double bond and the antibacterial layer-forming compound (B) has a primary amino group or a secondary amino group.

Based on what has been described above, the metallic bonding compound (A) is preferably a compound represented by the following formula (A1-1), formula (A1-2) or formula (A1-3).

$$X^{a1}—R^{a1}—CH=CH_2 \quad \text{(A1-1)}$$

$$X^{a2}—R_{a2}—CH=CH_2 \quad \text{(A1-2)}$$

$$X^{a3}—R^{a3}—R^{a4}—CO—CR^{a5}=CH^2 \quad \text{(A1-3)}$$

In the formula (A1-1), $X^{a1}$ is a hydrolysable silyl group. $R^{a1}$ is a single bond or an alkylene group having 1 or more and 10 or less carbon atoms. In the formula (A1-2), $X^{a2}$ is a phosphate group ($—O—P(=O)(OH)_2$) or a mercapto group. $R^{a2}$ is an alkylene group having 1 or more and 10 or less carbon atoms. In the formula (A1-3), $X^{a3}$ is a phosphate group ($—O—P(=O)(OH)_2$), a hydrolysable silyl group or a mercapto group. Rai is an alkylene group having 1 or more and 10 or less carbon atoms. $R^{a4}$ is —O— or —NH—. $R^{a5}$ is a hydrogen atom or a methyl group.

The number of carbon atoms in the alkylene group as $R^{a1}$, $R^{a2}$ and $R^{a3}$ is preferably 1 or more and 6 or less and more preferably 1 or more and 4 or less. Specific examples of the alkylene group as $R^{a1}$, $R^{a2}$ and $R^{a3}$ include a methylene group, an ethane-1,2-diyl group, a propane-1,3-diyl group, a butane-1,4-diyl group, a pentane-1,5-diyl group, a hexane-1,6-diyl group, a heptane-1,7-diyl group, an octane-1,8-diyl group, a nonane-1,9-diyl group and a decane-1,10-diyl group.

In a case where the functional group capable of bonding to a metal surface in the metallic bonding compound (A) is a phosphate group, preferable examples of the metallic bonding compound (A) include phosphate alkenyl esters such as allyl phosphate, 3-butenyl phosphate, 4-pentenyl phosphate and 5-hexenyl phosphate, phosphonooxyalkyl (meth)acrylates such as 2-phosphonoxyethyl (meth)acrylate, 3-phosphonoxypropyl (meth)acrylate and 4-phosphonoxybutyl (meth)acrylate and the like.

In a case where the functional group capable of bonding to a metal surface in the metallic bonding compound (A) is a hydrolysable silyl group, preferable examples of the metallic bonding compound (A) include alkenyltrialkoxysilanes such as vinyl trimethoxysilane, vinyl triethoxysilane, allyltrimethoxysilane, allyltriethoxylan, 3-butenyltrimethoxysilane, 3-butenyltriethoxysilane, 4-pentenyltrimethoxysilane and 4-pentenyltriethoxysilane and trialkoxysilylalkyl (meth) acrylates such as 2-trimethoxysilylethyl (meth)acrylate, 2-triethoxysilylethyl (meth)acrylate, 3-trimethoxysilylpropyl (meth)acrylate, 3-triethoxysilylpropyl (meth)acrylate, 4-trimethoxysilylbutyl (meth)acrylate and 4-trimethoxysilylbutyl (meth)acrylate.

In a case where the functional group capable of bonding to a metal surface in the metallic bonding compound (A) is a mercapto group, preferable examples of the metallic bonding compound (A) include alkenethiols such as 2-propene-1-thiol, 3-butene-1-thiol and 4-pentene-1-thiol, mercaptoalkyl (meth)acrylates such as 2-mercaptoethyl (meth) acrylate, 3-mercaptopropyl (meth)acrylate, 4-mercaptobutyl (meth)acrylate and 5-mercaptopentyl (meth)acrylate and the like.

The content of the metallic bonding compound (A) in the primer solution is not particularly limited as long as the primer solution can be applied in a desired thickness. The concentration of the metallic bonding compound (A) in the primer solution is preferably 0.1% by mass or more and 100% by mass or less, more preferably 1% by mass or more and 80% by mass or less and still more preferably 5% by mass or more and 60% by mass or less. In a case where the metallic bonding compound (A) is liquid at a temperature at which the antibacterial treatment is carried out, the metallic bonding compound (A) itself can be used as the primer solution.

[Solvent (S1)]

The primer solution may contain a solvent (S1). The solvent (S1) may be water, an organic solvent or an aqueous solution of an organic solvent. However, in a case where the metallic bonding compound (A) has a hydrolysable silyl group, the solvent (S1) preferably contains no water from the viewpoint of the stability over time of the primer solution. The solvent (S1) is selected so that the metallic bonding compound (A) dissolves in the primer solution.

Specific examples of the solvent (S1) includes sulfoxides such as dimethyl sulfoxide; sulfones such as dimethyl sulfone, diethyl sulfone, bis(2-hydroxyethyl) sulfone, and tetramethylene sulfone; amides such as N,N-dimethylformamide, N-methylformamide, N,N-dimethylacetamide, N-methylacetamide, and N,N-diethylacetamide; lactams such as N-methyl-2-pyrrolidone, N-ethyl-2-pyrrolidone, N-propyl-2-pyrrolidone, N-hydroxymethyl-2-pyrrolidone, and N-hydroxyethyl2-pyrrolidone; imidazolidinones such as 1,3-dimethyl-2-imidazolidinone, 1,3-diethyl-2-imidazolidinone, and 1,3-diisopropyl-2-imidazolidinone; alkanols such as methanol, ethanol, n-propyl alcohol, isopropyl alcohol, n-butanol, n-pentanol, and n-hexanol; glycols such as ethyleneglycol, propyleneglycol, 1,3-propanediol, diethyleneglycol, dipropyleneglycol, triethyleneglycol, and tripropyleneglycol; dialkyl glycol ethers such as dimethyl glycol, dimethyl diglycol, dimethyl triglycol, methyl ethyl diglycol, diethyl glycol, and triethyleneglycol butyl methyl ether; (poly)alkyleneglycol monoalkyl ethers such as ethyleneglycol monomethyl ether, ethyleneglycol monoethyl ether, ethyleneglycol monoethyl ether, ethyleneglycol mono-n-propyl ether, ethyleneglycol mono-n-butyl ether, diethyleneglycol monomethyl ether, diethyleneglycol monoethyl ether, diethyleneglycol mono-n-propyl ether, diethyleneglycol mono-n-butyl ether, triethyleneglycol monomethyl ether triethyleneglycol monoethyl ether, propyleneglycol mono-n-propyl ether, propyleneglycol mono-n-butyl ether, dipropyleneglycol monomethyl ether, dipropyleneglycol monoethyl ether, dipropyleneglycol mono-n-propyl ether, dipropyleneglycol mono-n-butyl ether, tripropyleneglycol monomethyl ether and tripropyleneglycol monoethyl ether; (poly)alkyleneglycol monoalkyl ether acetates such as ethyleneglycol monomethyl ether acetate, ethyleneglycol monoethyl ether acetate, diethyleneglycol monomethyl ether acetate, diethyleneglycol monoethyl ether acetate, propyleneglycol monomethyl ether acetate, and propyleneglycol monoethyl ether acetate; other ethers such as dimethyl ether, diethyl ether, methyl ethyl ether, dipropyl ether, diisopropyl ether, dibutyl ether, diisoamyl ether, diethyleneglycol dimethyl ether, diethyleneglycol methyl ethyl ether, diethyleneglycol diethyl ether, and tetrahydrofuran; ketones such as methylethylketone, cyclohexanone, 2-heptanone, and 3-heptanone; lactic acid alkyl esters such as methyl 2-hydroxypropionate, and ethyl 2-hydroxypropionate; other esters such as ethyl 2-hydroxy-2-methylpropionate, methyl 3-methoxypropionate, ethyl 3-methoxypropionate, methyl 3-ethoxypropionate, ethyl 3-ethoxypropionate, ethyl ethoxyacetate, ethyl hydroxyacetate, methyl 2-hydroxy-3-methylbutanoate, 3-methyl-3-methoxybutyl acetate, 3-methyl-3-methoxybutyl propionate, ethyl acetate, n-propyl acetate, i-propyl acetate, n-butyl acetate, i-butyl acetate, n-pentyl formate, i-pentyl acetate, n-butyl propionate, ethyl lactate, n-propyl lactate, i-propyl lactate, n-butyl lactate, methyl pyruvate, ethyl pyruvate, n-propyl pyruvate, methyl acetoacetate, ethyl acetoacetate, and ethyl 2-oxobutanoate; lactones such as β-propiolactone, γ-butyrolactone, and 5-pentyrolactone; linear, branched or cyclic aliphatic hydrocarbons such as n-hexane, n-heptane, n-octane, n-nonane, methyloctane, n-decane, n-undecane, n-dodecane, 2,2,4,6,6-pentamethylheptane, 2.2, 4,4,6,8,8-heptamethylnonane, cyclohexane, and methylcyclohexane; aromatic hydrocarbons such as benzene, toluene, xylene, 1,3,5-trimethylbenzene, and naphthalene; terpenes such as p-menthane, diphenylmenthane, limonene, terpinene, bornane, norbornane, and pinane; and the like.

[Other Components]

The primer solution may contain a variety of components other than the metallic bonding compound (A) and the solvent (S1) to an extent that the objective of the present invention is not impaired. Examples of the other components include a pH adjuster, a colorant, a surfactant, a defoamer, a viscosity modifier and the like.

<Antibacterial Solution>

The antibacterial solution contains an antibacterial layer-forming compound (B). The antibacterial layer-forming compound (B) preferably contains a compound capable of forming a covalent bond with the metallic bonding compound (A). Hereinafter, essential or arbitrary components that the antibacterial solution contains will be described.

[Antibacterial Layer-Forming Compound (B)]

The antibacterial layer-forming compound (B) is a compound capable of forming an extremely thin antibacterial layer on the surface of an article that becomes an object. In addition, the antibacterial layer-forming compound (B) is an antibacterial component and thus has a portion showing an antibacterial activity. Furthermore, in a case where an object substance is a metal, the antibacterial layer-forming compound (B) is a compound capable of forming an extremely thin antibacterial layer while forming a covalent bond with the metallic bonding compound (A) on the metal surface to which the metallic bonding compound (A) is bonding.

The antibacterial layer-forming compound (B) may be a low-molecular-weight compound or a high-molecular-weight compound such as a resin. The antibacterial layer-forming compound (B) is preferably a resin since the formation of the antibacterial layer is easy.

The antibacterial layer-forming compound (B) is preferably a reaction product of an antibacterial compound (B1) and a base material resin (B2) since the introduction of a desired type of antibacterial functional group into the antibacterial layer-forming compound (B) is easy or the adjustment of the antibacterial activity is easy. The antibacterial compound (B1) is a compound having an antibacterial group. In a case where the treatment object is a metal surface, it is preferable that the base material resin (B2) and the metallic bonding compound (A) are capable of forming a covalent bond from the viewpoint of the degree of three-dimensional freedom of the antibacterial functional group.

The functional group that is involved in the formation of the covalent bond between the metallic bonding compound (A) and the antibacterial layer-forming compound (B) is as described above. As described above, it is more preferable that the metallic bonding compound (A) has an ethylenic unsaturated double bond and the antibacterial layer-forming compound (B) has a primary amino group or a secondary amino group.

The antibacterial layer-forming compound (B) having a primary amino group or a secondary amino group is preferably a reaction product of the base material resin (B2) having a primary amino group or a secondary amino group and the antibacterial compound (B1).

Preferable examples of the reaction between the antibacterial compound (B1) and the base material resin (B2) include, similar to the reaction between the metallic bonding compound (A) and the antibacterial layer-forming compound (B),

- a reaction between a hydroxyl group and a dicarboxylic anhydride group,
- a reaction between a hydroxyl group and a halogen carbonyl group,
- a reaction between a hydroxyl group and an isocyanate group,
- a reaction between a primary amine group and a dicarboxylic anhydride group,
- a reaction between a primary amine group and a halogen carbonyl group,
- a reaction between a primary amine group and an isocyanate group,
- a reaction between a primary amine group or a secondary amine group and a halogenated alkyl group,
- a reaction between a primary amine group or a secondary amine group and an ethylenic unsaturated double bond,
- a reaction between ethylenic unsaturated double bonds,
- a reaction between an epoxy group and a dicarboxylic anhydride group,
- a reaction between an epoxy group and a carboxy group,
- a reaction between an epoxy group and an amino group, and the like. In addition, a reaction between the hydrolysable silyl group and a hydroxyl group, an amino group or a carboxy group can also be used as a method for reacting the antibacterial compound (B1) and the base material resin (B2).

Among these combinations, the reaction between a primary amine group and a halogenated alkyl group and the reaction between a primary amine group or a secondary amine group and an ethylenic unsaturated double bond are preferable since the reactivity is favorable. Since the procurement of the antibacterial compound (B1) and the base material resin (B2) is easy, it is more preferable that the antibacterial compound (B1) has an ethylenic unsaturated double bond or a halogenated alkyl group and the base material resin (B2) has a primary amino group or a secondary amino group.

The method for carrying out the reaction between the antibacterial compound (B1) and the base material resin (B2) is not particularly limited. A well-known method according to the type of a reactive functional group that is involved in the reaction is appropriately adopted as the method for reacting the antibacterial compound (B1) and the base material resin (B2). At the time of reacting the antibacterial compound (B1) and the base material resin (B2), the temperature is, for example, preferably −20° C. or more and 200° C. or less, more preferably −10° C. or more and 100° C. or less and still more preferably 0° C. or more and 50° C. or less. The reaction time is not particularly limited, and the reaction is carried out until the reaction proceeds as much as desired. Typically, the reaction time is preferably within a range of 10 minutes or more and 100 hours or less and more preferably within a range of 30 minutes or more and 50 hours or less. A solvent that is used in the reaction is not particularly limited as long as the solvent reacts with neither the antibacterial compound (B1) nor the base material resin (B2) and causes no undesired side reactions.

The antibacterial compound (B1) has an antibacterial group as described above. The antibacterial group is appropriately selected from a variety of functional groups that are known to exhibit antibacterial properties. As the antibacterial group, a quaternary ammonium salt group and a pyridinyl group are preferable and a quaternary ammonium salt group is more preferable since the procurement of the antibacterial compound (B1) is easy or the antibacterial activity is excellent.

The quaternary ammonium salt group is preferably a group represented by the following formula (B1).

$$—N^+R^{b3}R^{b4}R^{b5}\cdot X^- \qquad (B1)$$

In the formula (B1), $R^{b3}$, $R^{b4}$, and $R^{b5}$ are each independently, an alkyl group having 1 or more and 4 or less carbon atoms, or an aralkyl group having 7 or more and 10 or less carbon atoms. X− is a counter anion to the quaternary ammonium cation.

Specific examples of the alkyl group having 1 or more and 4 or less carbon atoms as $R^{b3}$, $R^{b4}$, and $R^{b5}$ include a methyl group, an ethyl group, an n-propyl group, an isopropyl group, an n-butyl group, an isobutyl group, a sec-butyl group, and a tert-butyl group. Among these, the methyl group and the ethyl group are preferred. Examples of the aralkyl group as $R^{b3}$, $R^{b4}$, and $R^{b5}$ include a benzyl group, a phenethyl group, and a 3-phenylpropyl group.

The counter anion as the $X^-$ is preferably a halide ion. Specific examples of the halide ion include a chloride ion, a bromide ion, an iodide ion, and a fluoride ion. As the halide ion, the chloride ion and the bromide ion are preferred.

The compound having the ethylenic unsaturated double bond and the quaternary ammonium salt group is preferably a compound represented by the following formula (b1).

$$CH{=}CR^{b1}{-}CO{-}R_{b6}{-}R^{b2}{-}N^{+}R^{b3}R^{b4}R^{b5}\cdot X^{-} \quad (b1)$$

In the formula (b1), $R^{b1}$ is a hydrogen atom or a methyl group. $R^{b2}$ is an alkyl group having 1 or more and 8 or less carbon atoms. $R^{b3}$, $R^{b4}$, and $R^{b5}$ are each independently an alkyl group having 1 or more and 4 or less carbon atoms, or an aralkyl group having 7 or more and 10 or less carbon atoms. $R^{b6}$ is —O— or —NH—. $X^-$ is a counter anion to the quaternary ammonium cation. $R^{b3}$, $R^{b4}$, $R^{b5}$ and $X^-$ in the formula (b1) are the same as those in the formula (B1).

Specific examples of the alkylene group as $R^{b2}$ in the formula (b1) include a methylene group, an ethane-1,2-diyl group, a propane-1,3-diyl group, a butane-1,4-diyl group, a pentane-1,5-diyl group, a hexane-1,6-diyl group, a heptane-1,7-diyl group, and an octane-1,8-diyl group.

Specific examples of the compound represented by the formula (b1) include (meth)acrylate compounds such as 2-(meth)acryloyloxyethyltrimethylammonium chloride, 2-(meth)aclyloyloxyethyltrimethylammonium bromide, 2-(meth)acryloyoxyethyltriethylammonium chloride, 2-(meth)acryloyoxyethyltriethylammonium bromide, 3-(meth)acryloyloxypropyltrimethylammonium chloride, 3-(meth)acryloyloxypropyltrimethylammonium bromide, 3-(meth)acryloyloxypropyltriethylammonium chloride, 3-(meth)acryloyloxypropyltriethylammonium bromide, 4 (meth) acrlyloyoxybutyltrimethylammonium chloride, 4-(meth)acrlyloyoxybutyltrimethylammonium bromide, 4-(meth)acrlyloyoxybutyltriethylammonium chloride, and 4-(meth)acrlyloyoxybutyltriethylammonium bromide; (meth)acrylamide compound such as 2-(meth)acryloylaminoethyltrimethylammonium chloride, 2-(meth)acryloylaminoethyltrimethylammonium bromide, 2-(meth)acryloylaminoethyltriethylammonium chloride, 2-(meth) acryloylaminoethyltriethylammonium bromide, 3-(meth) acryloylaminopropyltrimethylammonium chloride, 3-(meth)acryloyaminopropytrimethylammonium bromide, 3-(meth)acryloylaminopropyltriethylammonium chloride, 3-(meth)acryloylaminopropyltriethylammonium bromide, 4 (meth)acryloylaminobutyltrimethylammonium chloride, 4-(meth)acryloylaminobutyltrimethylammonium bromide, 4-(meth)acryloylaminobutyltriethylammonium chloride, and 4-(meth)acryloylaminobutyltriethylammonium bromide.

The compound having a halogenated alkyl group and the quaternary ammonium salt group is preferably a compound represented by the following formula (b2).

$$X^{b1}{-}R^{b2}{-}N^{+}R^{b3}R^{b4}R^{b5}\cdot X^{-} \quad (b2)$$

In the formula (b2), $R^{b2}$ is an alkylene group having 1 or more and 8 or less carbon atoms. $R^{b3}$, $R^{b4}$, and $R^{b5}$ are each independently an aralkyl group having 1 or more and 4 or less carbon atoms, or an aralkyl group having 7 or more and 10 or less carbon atoms. $X^-$ is a counter anion to the quaternary ammonium cation. $X^{b1}$ is a halogen atom. $R^{b2}$ in the formula (b2) is the same as $R^{b2}$ in the formula (b1). $R^{b3}$, $R^{b4}$, $R^{b5}$, and $X^-$ in the formula (B2) are the same as those in the formula (B1). Specific examples of the halogen atom as $X^{b1}$ in the formula (b2) include a chlorine atom, a bromine atom, an iodine atom, and a fluorine atom, and the chlorine atom and the bromine atom are preferable.

Suitable examples of the compound represented by the formula (b2) include 2-chloroethyltrimethylammonium chloride, 2-chloroethyltrimethylammonium bromide, 2-chloroethyltriethylammonium chloride, 2-chloroethyltriethylammonium bromide, 2-bromoethyltrimethylammonium chloride, 2-bromoethyltrimethylammonium bromide, 2-bromoethyltriethylammonium chloride, 2-bromoethyltriethylammonium bromide, 3-chloropropyltrimethylammonium chloride, 3-chloropropyltrimethylammonium bromide, 3-chloropropyltriethylammonium chloride, 3-chloropropyltriethylammonium bromide, 3-bromopropyltrimethylammonium chloride, 3-bromopropyltrimethylammonium bromide, 3-bromopropyltriethylammonium chloride, 3-bromopropyltriethylammonium bromide, 4-chlorobutyltrimethylammonium chloride, 4-chlorobutyltrimethylammonium bromide, 4-chlorobutyltriethylammoium chloride, 4-chlorobutyltriethylammonium bromide, 4-bromobutyltrimethylammonium chloride, 4-bromobutyltrimethylammonium bromide, 4-bromobutyltriethylammonium chloride, and 4-bromobutyltriethylammonium bromide.

Examples of the compound having the ethylenic unsaturated double bond and the pyridinyl group include a 2-vinylpyridine, a 3-vinylpyridine, a 4-vinylpyridine, a 2-allylpyridine, a 3-allylpyridine, and a 4-allylpyridine. Examples of the compound having the halogenated alkyl group and the pyridinyl group include a 2-chloromethylpyridine, a 3-chloromethylpyridine, a 4-chloromethylpyridine, a 2-bromomethylpyridine, a 3-bromomethylpyridine, a 4-bromomethylpyridine, a 2-(2-chloroethyl)pyridine, a 3-(2-chloroethyl) pyridine, a 4-(2-chloroethyl)pyridine, a 2-(2-bromoethyl) pyridine, a 3-(2-bromoethyl)pyridine, and a 4-(2-bromoethyl)pyridine.

The above-described antibacterial compound (B1) can be used as an antibacterial treatment agent not only to metal but also to a variety of materials.

As the base material resin (B2) having a primary amino group or a secondary amino group, an olefin-based polymer having a constituent unit derived from an olefin having an amino group, a (meth)acrylic resin having an amino group and polyethyleneimine are preferable and an olefin-based polymer having a constituent unit derived from an olefin having an amino group and polyethyleneimine are more preferable since it is easy to favorably form the antibacterial layer and to procure the base material resin.

Regarding the olefin-based polymer having a constituent unit derived from an olefin having an amino group, examples of the olefin having an amino group include allylamine, 3-butenylamine, 4-pentenylamine, 5-hexenylamine and the like. Among olefins having an amino group, allylamine is preferable. The content of the constituent unit derived from an olefin having an amino group in the olefin-based polymer is not particularly limited. The content of the constituent unit derived from an olefin having an amino group in the olefin-based polymer is preferably 70% by mass or more, more preferably 80% by mass or more, still more preferably 90% by mass or more and particularly preferably 100% by mass. Regarding the olefin-based polymer, examples of other olefins that may be copolymerized with the olefin having an amino group include chain-like olefins such as ethylene, propylene, 1-butene, 1-pentene, 1-hexene, 1-heptene, 1-octene, 1-nonene, 1-decene, 1-undecene and 1-dodecene and cyclic olefins such as cyclopentene, cyclohexene, cycloheptene, cyclooctene, cyclohexadiene, cycloheptadiene and cyclooctadiene.

Polyethyleneimine is also preferable as the base material resin (B2) since polyethyleneimine is easily soluble in water, organic solvents and the like, the reactivity with the antibacterial compound (B1) is favorable and the like. Polyethyleneimine is a polymer having a partial structure as shown below. As polyethyleneimine, any of branched polyethyleneimine and linear polyethyleneimine can be used.

[Chem. 1]

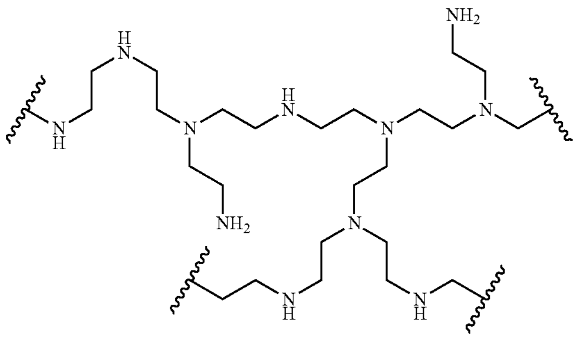

In the (meth)acrylic resin having the amino group, for example, a constituent unit derived from an aminoalkyl (meth)acrylate and an N-aminoalkyl (meth)acrylamide such as 2-aminoethyl (meth)acrylate, 3-aminopropyl (meth)acrylate, 4-aminobutyl (meth)acrylate, 5-aminopentyl (meth) acrylate, 6-aminohexyl (meth)acrylate, N-(2-aminoethyl) (meth)acrylamide, N-(3-aminopropyl) (meth)acrylamide, N-(4-aminobutyl) (meth)acrylamide, N-(5-pentyl) (meth) acrylamide, N-(6-hexyl) (meth)acrylamide, and the like.

For example, a constituent unit derived form an N-alkylaminoalkyl (meth)acrylate or an N-alkylaminoalkyl (meth) acrylamide such as N-methyl(2-aminoethyl) (meth)acrylate, N-ethyl(2-aminoethyl) (meth)acrylate, N-methyl(3-aminopropyl) (meth)acrylate, N-ethyl(3-aminopropyl) (meth)acrylate, N-methyl(4-aminobutyl) (meth)acrylate, N-ethyl(4-minobutyl) (meth)acrylate, N-[2-(methylamino)ethyl] (meth) acrylate, N-2-(ethylamino)ethyl] (meth)acrylate, N-[3-(methylamino)propyl] (meth)acrylate, N-[3-(ethylamino) propyl] (meth)acrylate, N-[4-(methylamino)butyl] (meth) acrylate, and N-[4-(ethylamino)butyl] (meth)acrylate is preferable as a constituent unit having the secondary amino group in the (meth)acrylic resin.

The (meth)acrylic resin having the amino group may have a constituent unit having a hydroxy group and an amino group. For example, a constituent unit derived from a hydroxyalkylaminoalkyl (meth)acrylate or an N-hydroxyalkylaminoalkyl (meth)acrylamide such as N-[2-(2-hydroxyethyl)amino]ethyl] (meth)acrylate, N-[3-[(2-hydroxyethyl) amino]propyl] (meth)acrylate, N-[4-[(2-hydroxyethyl) amino]butyl] (meth)acrylate, N-[2-[(2-hydroxyethyl)amino] ethyl] (meth)acrylamide, N-[3-[(2-hydroxyethyl)amino] propyl] (meth)acrylamide, and N-[4-[(2-hydroxyethyl) amino]butyl] (meth)acrylamide is preferable as such a constituent unit.

The (meth)acrylic resin having the amino group may have a constituent unit having a primary amino group and a secondary amino group. As such a constituent unit, for example, a constituent unit derived from an aminoalkylaminoalkyl (meth)acrylate, and N-aminoalkylaminoalkyl (meth)acrylamide such as N-[2-[(2-aminoethyl)amino] ethyl] (meth)acrylate, N-[3-[(2-aminoethyl)amino]propyl] (meth)acrylate, N-[4-[(2-aminoethyl)amino]butyl] (meth) acrylate, N-[2-[(2-aminoethyl)amino]ethyl] (meth)acrylamide, N-[3-[(2-aminoethyl)amino]propyl] (meth)acrylamide, and N-[4-[(2-aminoethyl)amino]butyl] (meth)acrylamide is preferable.

In addition to the above, for example, the (meth)acrylic resin having the amino group may include a constituent unit derived from monomers such as unsaturated monocarboxylic acids such as (meth)acrylic acid, and crotonic acid; unsaturated dicarboxylic acids such as maleic acid, fumaric acid, citraconic acid, mesaconic acid, and itaconic acid; (meth)acrylic acid alkyl esters such as methyl (meth)acrylate, ethyl (meth)acrylate, isopropyl (meth)acrylate, n-propyl (meth)acrylate, n-butyl (meth)acrylate, isobutyl (meth) acrylate, tert-butyl (meth)acrylate, n-pentyl (meth)acrylate, and isopentyl (meth)acrylate; (meth)acrylic acid aryl esters such as phenyl (meth)acrylate; N-alkyl(meth)acrylamides such as N-methyl(meth)acrylamide, N-ethyl(meth)acrylamide, N-n-propyl(meth)acrylamide, N-isopropyl(meth)acrylamide, N-n-butyl(meth)acrylamide, N-n-pentyl(meth)acrylamide, and N-isopentyl(meth)acrylamide; N-aryl(meth) acrylamides such as N-phenyl(meth)acrylamide; N,N-dialkyl(meth)acrylamide such as N,N-dimethyl(meth) acrylamide, N,N-diethyl(meth)acrylamide, N,N-di-n-propyl (meth)acrylamide, N,N-di-n-butyl(meth)acrylamide, and N,N-di-n-pentyl(meth)acrylamide; styrenes such as styrene, α-methylstyrene, β-methylstyrene, o-methylstyrene, m-methylstyrene, p-methylstyrene, and chlorostyrene.

The ratio of the constituent unit having a primary amino group or a secondary amino group in the (meth)acrylic resin having an amino group is preferably 1 mol % or more and 99 mol % or less, more preferably 5 mol % or more and 95 mol % or less, still more preferably 10 mol % or more and 90 mol % or less and particularly preferably 30 mol % or more and 70 mol % or less with respect to all of the constituent units that constitute the resin.

The content of the antibacterial layer-forming compound (B) in the antibacterial solution is not particularly limited as long as an antibacterial layer exhibiting an antibacterial activity as much as desired can be formed on the primer layer. The concentration of the antibacterial layer-forming compound (B) in the antibacterial solution is preferably 0.1% by mass or more and 100% by mass or less, more preferably 1% by mass or more and 80% by mass or less and still more preferably 5% by mass or more and 60% by mass or less. In a case where the antibacterial layer-forming compound (B) is liquid at a temperature at which the antibacterial treatment is carried out, the antibacterial layer-forming compound (B) itself can be used as the antibacterial solution.

[Solvent (S2)]

The antibacterial solution may contain a solvent (S2). The solvent (S2) may be water, an organic solvent or an aqueous solution of an organic solvent. The solvent (S2) is selected so that the antibacterial layer-forming compound (B) dissolves in the antibacterial solution.

Specific example of the organic solvent that is used as the solvent (S2) are the same as the specific examples of the organic solvent that is used as the solvent (S1).

[Other Components]

The antibacterial solution may contain a variety of components other than the antibacterial layer-forming compound (B) and the solvent (S2) to an extent that the objective of the present invention is not impaired. Examples of the other components include a pH adjuster, a colorant, a surfactant, a defoamer, a viscosity modifier and the like.

<<Treatment Method for Making Metal Surface Antibacterial>>

A treatment method for making a metal surface antibacterial includes:

a primer treatment of applying the primer solution to the metal surface and then bonding the metallic bonding compound (A) in the primer solution to the metal surface; and an antibacterial treatment of applying the antibacterial solution to the metal surface subjected to the primer treatment.

Such a treatment method makes it possible to obtain a product including a primer layer derived from the metallic bonding compound (A) bonding to the metal surface and an antibacterial layer composed of the antibacterial layer-forming compound (B) bonding to the primer layer through a covalent bond on the metal surface. The product including the antibacterial layer strongly bonding onto the metal surface, which is obtained by the above-described treatment method, stably exhibits a favorable antibacterial activity.

<Metal Surface>

The type of a metallic material that constitutes the metal surface is not particularly limited. Examples of the type of the metallic material that constitutes the metal surface include metals such as Fe, Cu, Mg, Al, Si, Ni, Ti, Co, V and Nb, a variety of stainless steels such as austenite-based stainless steel, martensite-based stainless steel and ferrite-based stainless steel and a variety of alloys such as a copper alloy, a magnesium alloy and an aluminum alloy. Among these metallic materials, stainless steels are preferable since the strength, corrosion resistance, workability and the like are excellent.

Regarding the product including the metal surface, the entire product may be composed of metal or only the surface may be composed of metal.

The shape of the metal surface is not particularly limited. The metal surface may be flat or a surface having a three-dimensional shape, for example, a spherical shape or a columnar shape. In addition, the metal surface may be flat or may have regular or irregular protrusions and recesses.

The method for applying the primer solution to the metal surface is not particularly limited. Specific examples of the application method include a spin coating method, a spraying method, a roller coating method, an immersion method and the like. In a case where the shape of a commercial product including a metal surface is a plate shape, a sheet shape, a film shape or the like, the spin coating method is preferable as the application method since it is easy to uniformly and evenly apply the primer solution to the metal surface. In addition, the immersion method is also preferable as the application method since it is easy to favorably apply the primer solution even to an uneven metal surface without using any special device.

The primer solution is applied to the metal surface, whereby the metallic bonding compound (A) bonds to the metal surface. After the application, the metal surface may be baked to accelerate the bonding of the metallic bonding compound (A) to the metal surface. The baking temperature is not particularly limited, but is preferably 50° C. or more or more 200° C. or less and more preferably 70° C. or more and 150° C. or less. The baking time is not particularly limited, but is preferably one minute or more and one hour or less and more preferably three minutes or more and 30 minutes or less.

A site on the metal surface to which the primer solution has been applied may be rinsed. In a case where the baking is carried out, the rinsing is preferably carried out after the baking. The rinsing makes it possible to remove the metallic bonding compound (A) that does not bond to the metal surface. A rinse agent is not particularly limited as long as the rinse agent is a liquid capable of removing the metallic bonding compound (A). As the rinse agent, the solvent (S1) that is contained in the primer solution is preferably used.

After the metallic bonding compound (A) is bonded to the metal surface as described above to form a primer layer, the antibacterial solution is applied to the metal surface including the primer layer.

After the formation of the primer layer, the antibacterial solution is applied onto the metal surface including the primer layer. The application method of the antibacterial solution is the same as the application method of the primer solution. In a case where the shape of a commercial product including a metal surface is a plate shape, a sheet shape, a film shape or the like, the spin coating method is preferable as the application method since it is easy to uniformly and evenly apply the antibacterial solution to the metal surface. In addition, the immersion method is also preferable as the application method since it is easy to favorably apply the antibacterial solution even to an uneven metal surface without using any special device. After the application of the antibacterial solution, the metal surface may be baked after the application of the antibacterial solution to accelerate the formation of a covalent bond between the metallic bonding compound (A) and the antibacterial layer-forming compound (B). The baking conditions are the same as the baking conditions after the application of the primer solution.

A site on the metal surface to which the antibacterial solution has been applied may be rinsed. In a case where the baking is carried out, the rinsing is preferably carried out after the baking. The rinsing makes it possible to remove the antibacterial layer-forming compound (B) that does not bond to the metallic bonding compound (A) on the metal surface. A rinse agent is not particularly limited as long as the rinse agent is a liquid capable of removing the antibacterial layer-forming compound (B). As the rinse agent, the solvent (S2) that is contained in the primer solution is preferably used.

According to the above-described method, a product including the primer layer derived from the metallic bonding compound (A) bonding to the metal surface and the antibacterial layer composed of the antibacterial layer-forming compound (B) bonding to the primer layer through a covalent bond on the metal surface can be obtained. The antibacterial layer strongly bonds to the metal surface of the product through the primer layer, and the metal surface is stably and favorably made antibacterial.

EXAMPLES

Hereinafter, the present invention will be more specifically described by showing examples, but the scope of the present invention is not limited to these examples.

Example 1 to Example 7, Comparative Example 1, and Comparative Example 2

In the examples and the comparative examples, the following A-1 and A-2 were used as a metallic bonding compound (A).

A-1: 2-Phosphonooxyethyl methacrylate

A-2: 3-Trimethoxysilylpropyl methacrylate

In the examples, the following B1-1 to B1-3 were used as an antibacterial compound (B1).

B1-1: 2-Acryloyloxyethyltrimethylammonium chloride

B1-2: 3-Acryloylaminopropyltrimethylammonium chloride

B1-3: 3-Bromopropyltrimethylammonium bromide

In the comparative examples, the following B'-1 and B'-2 were used as a non-antibacterial compound (B'1) that was analogous to the antibacterial compound (B1), but did not correspond to the antibacterial compound (B1).

B'-1: Acrylic acid

B'-2: Sodium 2-acryloylamino-2-methylpropanesulfonate

In the examples and the comparative examples, the following B2-1 and B2-2 were used as a base material resin (B2).

B2-1: Polyethyleneimine (weight-average molecular weight: 70,000)

B2-2: Polyallylamine (weight-average molecular weight: 50,000)

(Preparation of Primer Solution)

The metallic bonding compound (A) was dissolved in isopropyl alcohol according to the type shown in Table 1 such that the concentration became as shown in Table 1, thereby preparing primer solutions.

(Preparation of Antibacterial Solution)

The antibacterial compound (B1) or the non-antibacterial compound (B'1) of the type shown in Table 1 and the base material resin (B2) of the type shown in Table 1 were each added to water such that the concentrations became as shown in Table 1. The obtained aqueous solutions were stirred at room temperature for 24 hours, thereby preparing antibacterial solutions.

(Primer Treatment)

The primer solution of each of the examples and the comparative examples was applied onto a glass substrate by spin coating under conditions of 1000 rpm and 60 seconds. Similar to metal surfaces, a hydroxyl group is also present on the surfaces of glass substrates. Therefore, the surfaces of glass substrates are also treated to be antibacterial in the same manner as metal surfaces. After the spin coating, the glass substrate was baked at 100° C. for 10 minutes to form a primer layer on the glass substrate. After the baking, the glass substrate was rinsed with isopropyl alcohol. In Example 7, no baking was carried out.

(Antibacterial Treatment)

The antibacterial solution of each of the examples and the comparative examples was applied to the rinsed glass substrate including the primer layer by an immersion method. After the application by immersion, the glass substrate was baked at 100° C. for 10 minutes to form an antibacterial layer bonding to the primer layer on the glass substrate. After the baking, the glass substrate was rinsed with pure water. In Example 7, no baking was carried out.

(Measurement of Antibacterial Activity Value (R))

*Klebsiella pneumoniae* and *Staphylococcus aureus* were used as test bacteria.

$5.6\times10^3$ cu/mL of a bacterial fluid was inoculated onto the surface of the glass substrate treated according to the above-described method using the two-component treatment agent of each of the examples and the comparative examples. The glass substrate inoculated with the bacterial fluid was left under conditions of 35° C. and a humidity of 90% for 24 hours, and the viable bacteria count on the glass substrate was measured. In addition, the bacterial fluid was also ingested into an untreated glass substrate according to the above-described method, then, the glass substrate was left under conditions of 35° C. and a humidity of 90% for 24 hours, and then the viable bacteria count on the glass substrate was measured. The logarithm value Ut of the viable bacteria count of the untreated glass substrate and the logarithm value At of the viable bacteria count of the glass substrate treated with the two-component treatment agent were obtained based on the measured values of the viable bacteria counts. The antibacterial activity value (R) was calculated from Ut and At based on the following equation. The calculated antibacterial activity values (R) are shown in Table 1. Antibacterial activity value (R)=Ut−At

Example 8

An antibacterial treatment and the measurement of the antibacterial activity value (R) were carried out in the same manner as in Example 1 except that the substrate as the treatment object was changed from the glass substrate to a stainless steel substrate. The calculated antibacterial activity values (R) are shown in Table 1.

TABLE 1

| | | Example | | | | | | | | Comparative example | |
|---|---|---|---|---|---|---|---|---|---|---|---|
| | | 1 | 2 | 3 | 4 | 5 | 6 | 7 | 8 | 1 | 2 |
| Metallic binding compound (A) | A-1 (% by mass) | 20 | 20 | 20 | 20 | — | 20 | 20 | 20 | 20 | 20 |
| | A-2 (% by mass) | — | — | — | — | 20 | — | — | — | — | — |
| Antibacterial compound (B1) | B1-1 (% by mass) | 5 | — | — | — | 5 | 5 | 5 | 5 | — | — |
| | B1-2 (% by mass) | — | 5 | 5 | — | — | — | — | — | — | — |
| | B1-3 (% by mass) | — | — | — | 5 | — | — | — | — | — | — |
| Non-antibacterial compound (B'1) | B'1-1 (% by mass) | — | — | — | — | — | — | — | — | 5 | — |
| | B'1-1 (% by mass) | — | — | — | — | — | — | — | — | — | 5 |
| Base material resin (B2) | B2-1 (% by mass) | 5 | 5 | — | — | 5 | 5 | 5 | 5 | 5 | 5 |
| | B2-2 (% by mass) | — | — | 5 | 5 | — | — | — | — | — | — |
| Antibacterial activity value (R) | *Klebsiella pneumoniae* | 5.1 | 5.0 | 5.2 | 5.0 | 5.0 | 5.1 | 5.0 | 5.1 | 0.2 | 0.1 |

According to the examples, it is found that, when a primer treatment is carried out on the surface of a substrate using a primer solution containing the metallic bonding compound (A) having a functional group capable of bonding to a metal surface and then an antibacterial treatment is carried out thereon using an antibacterial solution containing the antibacterial layer-forming compound (B) capable of forming a covalent bond with the metallic bonding compound (A), the surface of the substrate is favorably made antibacterial. From the fact that, in Example 1 in which the antibacterial treatment was carried out on the glass substrate and in Example 8 in which the antibacterial treatment was carried out on the stainless steel substrate, the same antibacterial activity value (R) was obtained, the availability of an antibacterial treatment for stainless steel substrates can be confirmed from a test in which a glass substrate is used.

What is claimed is:

1. A two-component treatment agent used for an antibacterial treatment of a metal surface, the two-component treatment agent comprising:

a primer solution containing a metallic bonding compound (A) having a functional group capable of bonding to the metal surface; and an antibacterial solution containing an antibacterial layer-forming compound (B), wherein the functional group capable of bonding to the metal surface is a phosphate group, and the metallic bonding compound (A) and the antibacterial layer-forming compound (B) are capable of forming a covalent bond.

2. The two-component treatment agent according to claim 1, wherein the antibacterial layer-forming compound (B) is a reaction product of an antibacterial compound (B1) and a base material resin (B2), and the antibacterial layer-forming compound (B) is capable of forming a covalent bond with the metallic bonding compound (A).

3. The two-component treatment agent according to claim 2, wherein the base material resin (B2) is an olefin-based polymer having a constituent unit derived from an olefin having an amino group or polyethyleneimine.

4. The two-component treatment agent according to claim 2, wherein the base material resin (B2) is an olefin-based polymer having a constituent unit derived from an olefin having an amino group or polyethyleneimine, and the antibacterial compound (B1) is a compound having an ethylenic unsaturated double bond and an antibacterial group.

5. The two-component treatment agent according to claim 4, wherein the antibacterial group is at least one selected from a quaternary ammonium salt group and a pyridinyl group.

6. The two-component treatment agent according to claim 5, wherein the antibacterial compound is at least one selected from the group consisting of a compound represented by the following formula (b1):

$$CH_2{=}CR^{b1}{-}CO{-}R^{b6}{-}R^{b2}{-}N^+R^{b3}R^{b4}R^{b5}\cdot X^- \quad (b1),$$

a compound represented by the following formula (b2):

$$X^{b1}{-}R^{b2}{-}N^+R^{b3}R^{b4}R^{b5}\cdot X^- \quad (b2),$$

2-vinylpyridine, 3-vinylpyridine and 4-vinylpyridine, wherein, in the formula (b1), $R^{b1}$ is a hydrogen atom or a methyl group, $R^{b2}$ is an alkylene group having 1 or more and 8 or less carbon atoms, $R^{b3}$, $R^{b4}$ and $R^{b5}$ are each independently an alkyl group having 1 or more and 4 or less carbon atoms or an aralkyl group having 7 or more and 10 or less carbon atoms, $R^{b6}$ is —O— or —NH—, and X is a counter anion for a quaternary ammonium cation, and wherein, in the formula (b2), $R^{b2}$ is an alkylene group having 1 or more and 8 or less carbon atoms, $R^{b3}$, $R^{b4}$ and $R^{b5}$ are each independently an alkyl group having 1 or more and 4 or less carbon atoms or an aralkyl group having 7 or more and 10 or less carbon atoms, X-is a counter anion for a quaternary ammonium cation, and $X^{b1}$ is a halogen atom.

7. A treatment method for making a metal surface antibacterial using the two-component treatment agent according to claim 1, the method comprising:

a primer treatment of applying the primer solution to the metal surface and then bonding the metallic bonding compound (A) in the primer solution to the metal surface; and an antibacterial treatment of applying the antibacterial solution to the metal surface subjected to the primer treatment.

8. The treatment method according to claim 7, wherein the metal surface is a surface composed of stainless steel.

9. An antibacterial treatment agent comprising an antibacterial layer-forming compound comprising a reaction product of an antibacterial compound (B1) and a base material resin (B2), wherein the antibacterial compound (B1) comprises a low-molecular-weight compound represented by the following formula (b1):

$$CH_2{=}CR^{b1}{-}CO{-}R^{b6}{-}R^{b2}{-}N^+R^{b3}R^{b4}R^{b5}\cdot X^- \quad (b1), \text{ or}$$

a compound represented by the following formula (b2):

$$X^{b1}{-}R^{b2}{-}N^+R^{b3}R^{b4}R^{b5}\cdot X^- \quad (b2),$$

wherein, in the formula (b1), $R^{b1}$ is a hydrogen atom or a methyl group, $R^{b2}$ is an alkylene group having 1 or more and 8 or less carbon atoms, $R^{b3}$, $R^{b4}$ and $R^{b5}$ are each independently an alkyl group having 1 or more and 4 or less carbon atoms or an aralkyl group having 7 or more and 10 or less carbon atoms, $R^{b6}$ is —O— or —NH—, and X is a counter anion for a quaternary ammonium cation, wherein, in the formula (b2), $R^{b2}$ is an alkylene group having 1 or more and 8 or less carbon atoms, $R^{b3}$, $R^{b4}$ and $R^{b5}$ are each independently an alkyl group having 1 or more and 4 or less carbon atoms or an aralkyl group having 7 or more and 10 or less carbon atoms, X is a counter anion for a quaternary ammonium cation, and $X^{b1}$ is a halogen atom, and wherein the base material resin (B2) is an olefin-based polymer having a constituent unit derived from an olefin having an amino group or polyethyleneimine.

10. The two-component treatment agent according to claim 1, wherein the metallic bonding compound (A) is selected from the group consisting of a phosphate alkenyl ester and a phosphonooxyalkyl (meth)acrylate.

* * * * *